United States Patent
Gross et al.

(10) Patent No.: US 8,620,604 B2
(45) Date of Patent: Dec. 31, 2013

(54) GENERATING A COMPOSITE VIBRATION PROFILE FOR A COMPUTER SYSTEM

(75) Inventors: Kenny C. Gross, San Diego, CA (US);
Aleksey M. Urmanov, San Diego, CA (US); Anton A. Bougaev, La Jolla, CA (US)

(73) Assignee: Oracle America, Inc., Redwood Shores, CA (US)

( * ) Notice: Subject to any disclaimer, the term of this patent is extended or adjusted under 35 U.S.C. 154(b) by 367 days.

(21) Appl. No.: 12/204,124

(22) Filed: Sep. 4, 2008

(65) Prior Publication Data

US 2010/0057383 A1 Mar. 4, 2010

(51) Int. Cl.
*G01F 17/00* (2006.01)

(52) U.S. Cl.
USPC .......................................................... 702/56

(58) Field of Classification Search
USPC .......................................................... 702/56
See application file for complete search history.

(56) References Cited

U.S. PATENT DOCUMENTS

| | | | |
|---|---|---|---|
| 6,281,650 B1 * | 8/2001 | Yutkowitz | 318/561 |
| 7,282,925 B2 * | 10/2007 | Alperin et al. | 324/538 |
| 7,711,452 B2 * | 5/2010 | Konstadinidis et al. | 700/280 |
| 2002/0038188 A1 * | 3/2002 | Fioravanti | 702/75 |
| 2002/0138217 A1 * | 9/2002 | Shen et al. | 702/56 |
| 2003/0218819 A1 * | 11/2003 | Sri-Jayantha et al. | 360/75 |
| 2004/0216524 A1 * | 11/2004 | Lafleur et al. | 73/579 |
| 2007/0168157 A1 * | 7/2007 | Khibnik et al. | 702/182 |
| 2009/0106600 A1 * | 4/2009 | Gross et al. | 714/39 |
| 2010/0023614 A1 * | 1/2010 | Lewis et al. | 709/224 |

\* cited by examiner

*Primary Examiner* — Alexander H Taningco
*Assistant Examiner* — Yaritza H Perez Bermudez
(74) *Attorney, Agent, or Firm* — Park, Vaughan, Fleming & Dowler LLP; A. Richard Park

(57) ABSTRACT

Some embodiments of the present invention provide a system that generates a composite vibration profile in a frequency range for a computer system. First, a vibration spectrum in the frequency range is measured for a test computer system in each configuration in a set of configurations. Then, the composite vibration profile for the computer system is generated based on the measured vibration spectra.

18 Claims, 3 Drawing Sheets

GENERATING A COMPOSITE VIBRATION PROFILE FOR A COMPUTER SYSTEM

BACKGROUND

1. Field

The present invention generally relates to techniques for mechanically testing computer systems. More specifically, the present invention relates to a method and an apparatus that generates a composite vibration profile in a frequency range for a computer system.

2. Related Art

Computer systems are becoming increasingly susceptible to performance degradation due to vibration. In particular, vibrations can impact the throughput of some new high-density disk drives, causing not only degradation of their performance, but also in some cases leading to computer system crashes or failures. In order to design and test new computer systems to limit the impact of these vibrational effects, computer systems are often tested on vibration tables while the impact on disk drive throughput is monitored. Since some computer systems are mounted in racks, computer system manufacturers sometimes also test the throughput of their computer systems while mounted in racks. However, vibration testing can be time consuming and associated test equipment can be expensive. Therefore, computer systems may often only be tested in one slot in a rack even though the vibration profile in one slot may not be representative of the vibrations in other slots in the rack.

Hence, what is needed is a method and system that generates a composite vibration profile in a frequency range for a computer system, without the above-described problems.

SUMMARY

Some embodiments of the present invention provide a system that generates a composite vibration profile in a frequency range for a computer system. First, a vibration spectrum in the frequency range is measured for a test computer system in each configuration in a set of configurations. Then, the composite vibration profile for the computer system is generated based on the measured vibration spectra.

In some embodiments, configurations in the set of configurations include permutations of a location of the test computer system and other computer systems in slots in a set of slots in a computer system rack.

In some embodiments, configurations in the set of configurations include vibrating the computer system rack in the frequency range.

In some embodiments, configurations in the set of configurations include vibrating the computer system rack in the frequency range based on vibrations measured at a user location environment.

In some embodiments, configurations in the set of configurations include vibrating the computer system rack in the frequency range based on vibrations measured at a location of a user environment.

In some embodiments, the configurations in the set of configurations include variations of an operational mode of the test computer system and the other computer systems.

In some embodiments, configurations in the set of configurations include permutations of a user location environment.

In some embodiments, configurations in the set of configurations include permutations of a location of a user environment.

In some embodiments, generating the composite vibration profile includes generating the composite vibration profile based on a highest amplitude vibration from the vibration spectra at each frequency in a set of frequencies in the frequency range.

In some embodiments, frequencies in the set of frequencies are separated by 1 Hz or less, and the frequency range includes frequencies at least from 50 Hz to 2,500 Hz.

In some embodiments, measuring the vibration spectrum includes measuring the vibration spectrum using one or more accelerometers.

In some embodiments, measuring the vibration spectrum includes measuring a first acceleration of a first location, a second acceleration of a second location, a third acceleration of a third location and a fourth acceleration of a fourth location, wherein the first location, the second location, the third location, and the fourth location are situated at vertices of a known tetrahedron.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Figure 1B:
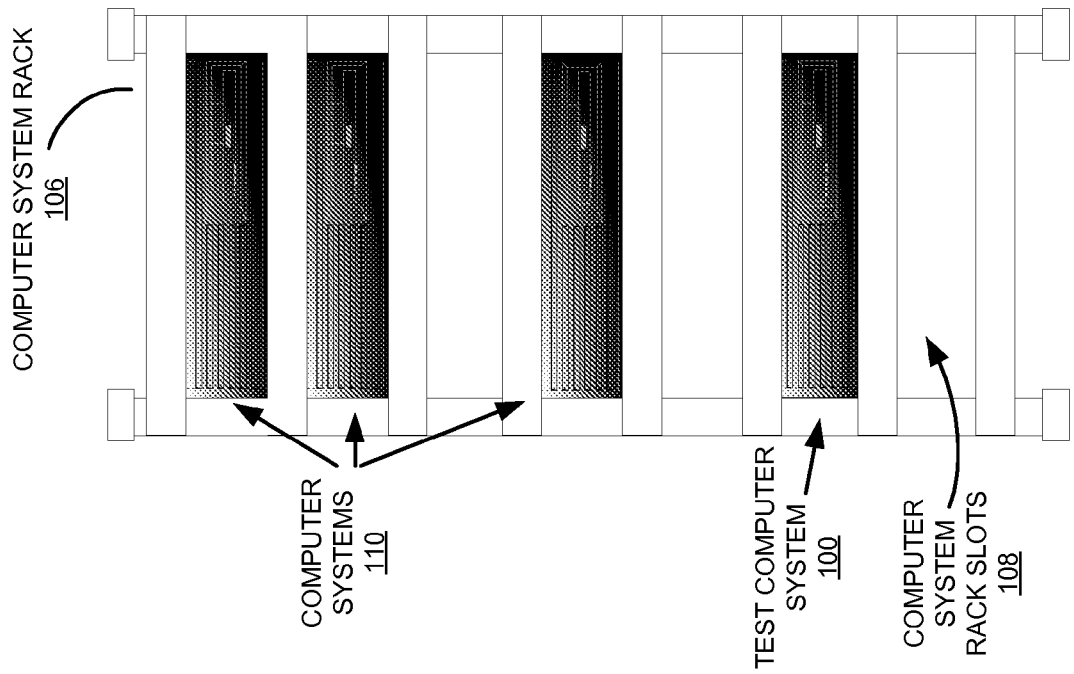
FIG. 1B illustrates a computer system rack which accommodates a test computer system and other computer systems for measuring a composite vibration profile in a frequency range for a computer system in accordance with some embodiments of the present invention.
Figure 1A:
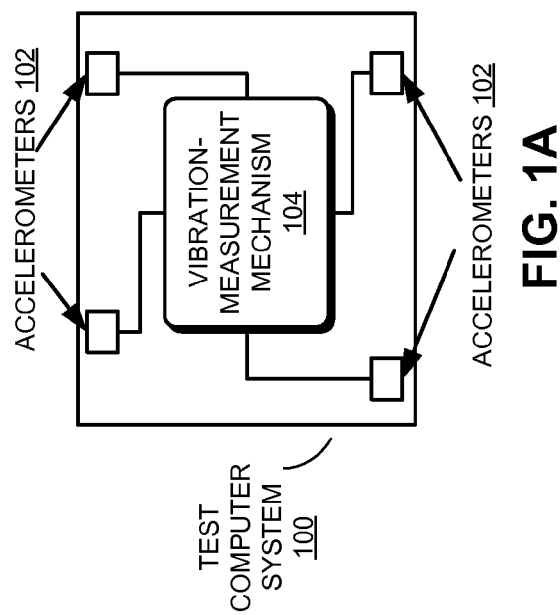
FIG. 1A illustrates a test computer system, including a vibration-measurement mechanism, that measures vibrations of the test computer system in a frequency range in accordance with some embodiments of the present invention.

FIG. 1A illustrates a test computer system, including a vibration-measurement mechanism, that measures vibrations of the test computer system in a frequency range in accordance with some embodiments of the present invention. Test computer system 100 includes accelerometers 102 coupled to vibration-measurement mechanism 104.

In some embodiments, test computer system 100 is a fully functioning computer system that can include but is not limited to a server, a server blade, a datacenter server, an enterprise computer, a field-replaceable unit that includes a processor, or any other computation system that includes one or more processors and one or more cores in each processor. In other embodiments, test computer system 100 is not a fully functioning computer system but may have a size and weight distribution similar to a fully functioning computer system.

Accelerometers 102 can be any type of acceleration-measuring device including but not limited to integrated electronics piezoelectric accelerometers, micro-electromechanical systems (MEMS) accelerometers, mechanical or optical accelerometers, remote sensing devices, or any other device or system that can measure acceleration of a specified location. In some embodiments, accelerometers 102 are 3-axis accelerometers that measure acceleration in three orthogonal directions. Accelerometers 102 are placed in test computer system 100 on the vertices of a known tetrahedron so that the spatial relationship between the locations of accelerometers 102 is known, and such that all four of accelerometers 102 are not in the same plane and no three of accelerometers 102 form a straight line. In some embodiments, in which vibrations in a predetermined plane are to be measured, three 2-axis accelerometers are used to measure vibrations and their axes are placed parallel to the vibration plane to be measured. In some embodiments, the vibrations of test computer system 100 are measured using any suitable configuration of accelerometers.

Vibration-measurement mechanism 104 is coupled to accelerometers 102 and can be implemented in any technology and any combination of hardware and software. In some embodiments, vibration-measurement mechanism 104 operates on one or more processors of computer system 100. In other embodiments, vibration-measurement mechanism 104 operates on a separate processor located in vibration-measurement mechanism 104. In some embodiments, vibration-measurement mechanism 104 is located outside of test computer system 100 and operates on one or more separate computer systems. In some embodiments, vibration-measurement mechanism 104 includes a storage mechanism to store vibration measurements. In other embodiments, vibration-measurement mechanism includes a wired or wireless communication mechanism that communicates information related to the acceleration measurement of accelerometers 102 to a storage mechanism outside of test computer system 100.

During operation, vibration-measurement mechanism 104 stores information related to the accelerations monitored by each of accelerometers 102. In some embodiments, vibration-measurement mechanism 104 generates a composite vibration profile by processing the information received from accelerometers 102 and determining the vibration patterns of test computer system 100 based on the accelerations measured by each of accelerometers 102 and the axes of the vibration patterns. In some embodiments, vibration patterns along up to three orthogonal linear vibration axes and up to three orthogonal rotational vibration axes are determined by vibration-measurement mechanism 104, and included in the composite vibration profile. In some embodiments, vibration-measurement mechanism 104 further processes the information and/or the composite vibration profile by transforming it to the frequency domain. In some embodiments, transforming the information and/or the composite vibration profile from the time domain to the frequency domain involves using a fast Fourier transform (FFT). In other embodiments, other transform functions can be used, including, but not limited to, a Laplace transform, a discrete Fourier transform, a Z-transform, and any other transform technique now known or later developed. In some embodiments, vibration-measurement mechanism 104 further processes the frequency domain representation of the vibration pattern and/or the composite vibration profile and selects the maximum amplitude at each frequency in a set of frequencies in a frequency domain. For example, in some embodiments, each time test computer system 100 is adjusted into a new configuration as described below, the amplitudes of vibrations in the frequency range at least from 50 Hz to 2,500 Hz are measured by vibration-measurement mechanism 104. Then, at each frequency, the measured amplitude is compared to the previously measured highest amplitude and the current highest amplitude at each frequency is determined. The composite vibration profile generated by the above process then contains the highest amplitude measured using test computer system 100 from all of the configurations for test computer system 100, at each frequency monitored along each of the up to three orthogonal linear vibration axes and up to three orthogonal rotational vibration axes monitored. Note that other frequency ranges may be used without departing from the present invention.

FIG. 1B illustrates a computer system rack which accommodates a test computer system and other computer systems for measuring a composite vibration profile in a frequency range for a computer system in accordance with some embodiments of the present invention. Computer system rack 106 includes seven computer system rack slots 108. In the configuration of FIG. 1B, test computer system 100 is in one of computer system slots 108 in computer system rack 106, and three of computer system rack slots 108 are populated with other computer systems 110. Note that computer system rack 106 can generally include any computer system rack.

Computer systems 110 can include any computer system that may be operated in computer system rack 106 along with test computer system 100. Computer systems 110 can include but are not limited to a server, a server blade, a datacenter server, an enterprise computer, a field-replaceable unit that includes a processor, or any other computation system. In some embodiments, computer systems 110 are not all the same type of computer system. In some embodiments, devices other than computer systems 110 are used to populate one or more of computer system rack slots 108.

During operation, vibrations of test computer system 100 are measured as described above. In some embodiments, the vibrations of test computer system 100 are measured in a frequency range for various permutations of the configurations of computer systems 110 and test computer system 100 in computer system rack slots 108, and a composite vibration profile is generated as described above. In some embodiments, the configurations include but are not limited to one or more of the following: the position of test computer system 100 in computer system rack slots 108; the occupancy of computer system rack slots 108 by computer systems 110, which may include configurations with zero to six computer systems 110; configurations of computer system 110 and test computer system 100, including but not limited to configurations of disk drives or other computer system components, and configurations of the operation mode of computer systems 110 and test computer system 100. Variations of the operation mode of computer systems 110 and test computer system 100 can include but are not limited to permutations of the power state, of the operation load, and of the load profile.

In some embodiments, the configurations can further include but are not limited to other computer system test racks, and mounting configurations for computer system rack 106. In some embodiments, configurations can further include permutations of a user location environment, including but not limited to one or more of the following: rack mounting configurations at a user location, the distance to heating and/or cooling equipment, the cycling of heating and/or cooling equipment, permutations of other equipment operating on and/or near the computer system rack, or any other placement of the computer system rack or equipment causing vibrations in the computer system rack at a customer location.

In some embodiments, configurations can further include permutations of the location of the user environment. For example, in some embodiments, a user may use the same or a similar computer system in a number of locations, each of which has a different environment, including but not limited to differing vibration environments caused by nearby equipment, or differing ambient temperatures or temperature cycling. In some embodiments, differences in ambient temperatures can result in differences in vibrations generated by computer system components such as cooling fans.

Figure 1C:
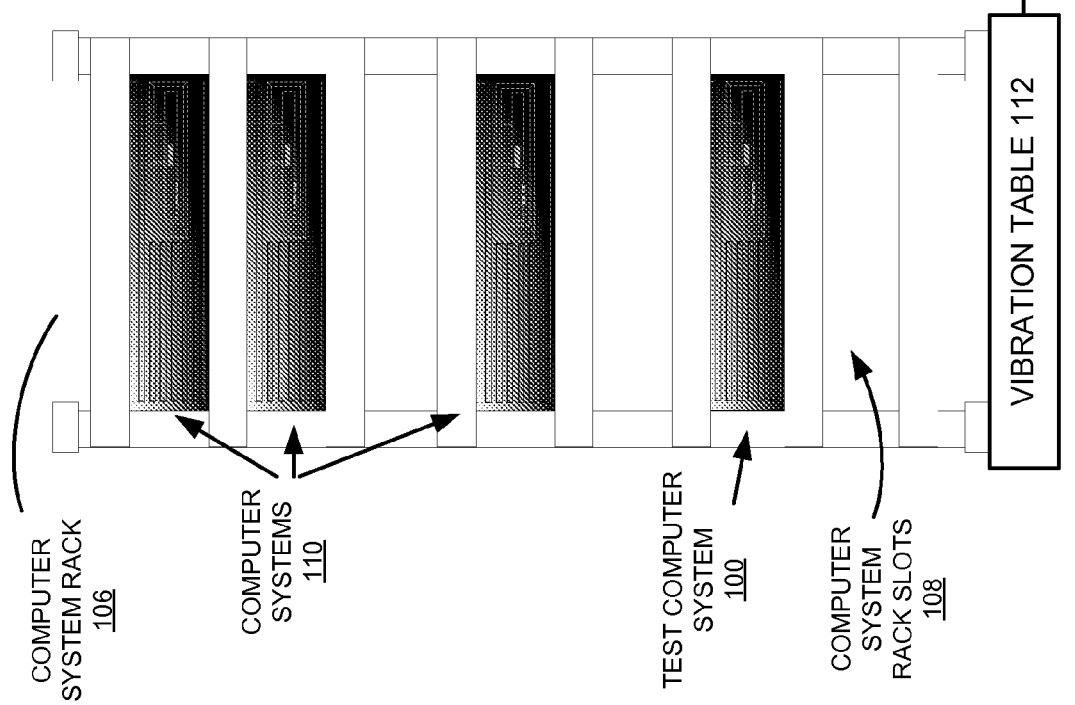
FIG. 1C illustrates a vibration table coupled to a computer system rack which accommodates a test computer system and other computer systems for measuring a composite vibration profile in a frequency range for a computer system in accordance with some embodiments of the present invention.

FIG. 1C illustrates a vibration table coupled to a computer system rack which accommodates a test computer system and other computer systems for measuring a composite vibration profile in a frequency range for a computer system in accordance with some embodiments of the present invention. In FIG. 1C, computer system rack 106 of FIG. 1B is coupled to vibration table 112. Additionally, vibration table 112 is coupled to vibration table controller 114 which is in turn coupled to vibration-profile-storage mechanism 116.

Vibration table 112 generates vibrations and vibrates computer system rack 106 in response to signals from vibration-table controller 114. In some embodiments, vibration table 112 vibrates along one or more of six vibration axes, including up to three orthogonal linear vibration axes and up to three orthogonal rotational vibration axes. Vibration table 112 can be implemented in any technology now known or later developed and can include mechanisms for producing vibrations that are well-known in the art.

Vibration table controller 114 can include any mechanism that can control vibration table 112. Furthermore, vibration table controller 114 can be implemented in any technology now known or later developed, and can include mechanisms for controlling vibration table 202 that are well-known in the art. In some embodiments vibration table controller 114 operates on a computer system. Note that in some embodiments, vibration table controller 204 is included in vibration table 202.

Vibration-profile-storage mechanism 116 can include any mechanism that can store vibration profiles and communicate them to vibration table controller 114. Furthermore, vibration-profile-storage mechanism 116 can be implemented in any technology now known or later developed, and can include mechanisms for storing vibration profiles that are well-known in the art. In some embodiments vibration-profile-storage mechanism 116 operates on a computer system. Note that in some embodiments, vibration-profile-storage mechanism 116 is included in vibration table 202.

Some embodiments of the present invention additionally use a vibration-measuring module that measures vibrations at a location. In some embodiments, the vibration-measuring module can include but is not limited to any known mechanism for measuring vibrations at a location along up to three orthogonal linear vibration axes and up to three orthogonal rotational vibration axes. In some embodiments, the vibration-measuring module includes four accelerometers which are the same or similar to accelerometers 102 and positioned on the vertices of a known tetrahedron so that the spatial relationship between the locations of the accelerometers is known, and such that all four accelerometers are not in the same plane and no three of the accelerometers form a straight line. The accelerometers are coupled to a mechanism which is the same or similar to vibration-measurement mechanism 104. Note that the vibration-measuring module can be enclosed in any suitable housing. During operation of the vibration-measuring module, it is placed at a location and measures one or more vibration spectra at the location it is placed.

In some embodiments, the vibration-measuring module further processes the one or more measured vibration spectra by transforming them to the frequency domain. In some embodiments, transforming the vibration spectra from the time domain to the frequency domain involves using a fast Fourier transform (FFT). In other embodiments, other transform functions can be used, including, but not limited to, a Laplace transform, a discrete Fourier transform, a Z-transform, and any other transform technique now known or later developed. In some embodiments, the vibration-measurement mechanism in the vibration-measuring module further processes the frequency domain representation of the vibration spectra and selects the maximum amplitude at each frequency in a set of frequencies in a frequency domain. For example, in some embodiments, each time the vibration-measuring module is adjusted into a new configuration, as described below, the amplitudes of vibrations at 1 Hz increments in the frequency range at least from 50 Hz to 2,500 Hz are measured. Then, at each frequency, the measured amplitude is compared to the previously measured highest amplitude and the current highest amplitude at each frequency is determined. A composite vibration profile generated by the above process then contains the highest amplitude measured using the vibration-measuring module from all of the configurations, at each frequency monitored along each of the up to three orthogonal linear vibration axes and up to three orthogonal rotational vibration axes monitored. Note that other frequency ranges and frequency increments may be used without departing from the present invention.

Some embodiments of the present invention operate as follows. First a vibration-measuring module is used to measure vibration spectra in permutations of a user location environment and/or permutations of the location of a user environment. Permutations of a user location environment can include but are not limited to one or more of the following: the distance to heating and/or cooling equipment, the cycling of heating and/or cooling equipment, permutations of other equipment operating on and/or near the vibration-measuring module, or any other placement of the vibration-measuring module or equipment causing vibrations at a customer location.

Permutations of the location of a user environment can include but are not limited to one or more of the different locations where a user may operate the same or a similar computer system. For example, a user may use the same or a similar computer system and/or computer system rack in a number of locations, each of which has a different environment. The different locations may have different temperature, humidity, temperature cycling, and/or humidity cycling behavior which results in variations in vibration spectra generated by nearby equipment. Additionally different locations of a user environment can be differently constructed, resulting differing transmission of vibrations from nearby equipment. Therefore, in some embodiments, a vibration-measuring module measures one or more vibration spectra at permutations of the location of the user environment.

Next, the vibration spectra and/or one or more composite vibration profiles measured by the vibration-measuring module in permutations of a user location environment and/or permutations of the location of a user environment are loaded into vibration-profile-storage mechanism 116. Then, vibration table controller 114 controls vibration table 112 to vibrate based on the vibration spectra and/or one or more composite vibration profiles in vibration-profile-storage mechanism 116. The vibrations of vibration table 112 cause rack 106 to vibrate, and during the vibration of rack 106, the vibrations of test computer system 100 are measured. Then, a composite vibration profile is generated by vibration-measurement mechanism 104 as described above.

In some embodiments, the vibrations of test computer system 100 are measured in the frequency range for various permutations of the configurations of computer systems 110 and test computer system 100 in computer system rack slots 108, and a composite vibration profile is generated as described above. In some embodiments, the configurations include the configuration described above with reference to FIG. 2B. Note that in some embodiments, the above process is performed for vibration patterns and/or composite vibration profiles for one or more of up to three orthogonal linear vibration axes and up to three orthogonal rotational vibration axes. The vibrations of test computer system 100 are measured and a composite vibration profile is generated as described above for each axis.

Note that in some embodiments, vibration patterns and/or composition vibration profiles generated using configurations from the embodiments of FIGS. 1B and 1C can be combined to generate a composite vibration profile as described above. For example, a composite vibration profile generated from an embodiment depicted in FIG. 1B can be combined with a composite vibration profile from an embodiments depicted in FIG. 1C by generating a composite vibration profile that, for each frequency in the frequency range, includes the highest amplitude of vibration from each of the two constituent composite vibration profiles.

Figure 2:
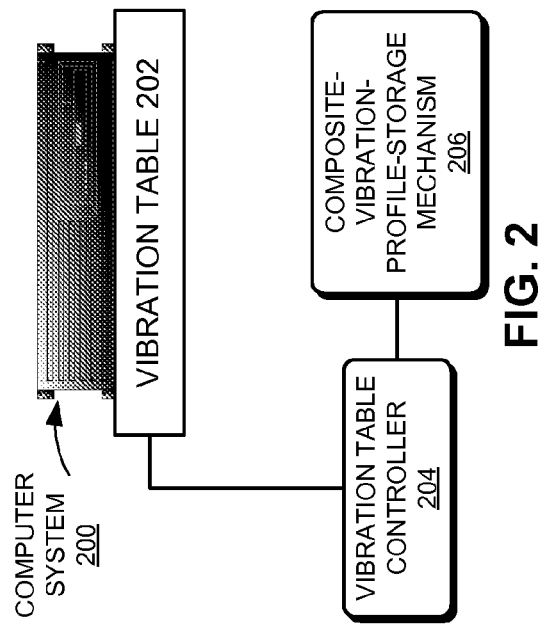
FIG. 2 illustrates an apparatus that vibrates a computer system using a composite vibration profile generated in accordance with some embodiments of the present invention.

FIG. 2 illustrates an apparatus that vibrates a computer system using a composite vibration profile generated in accordance with some embodiments of the present invention. Note that computer system 200 is coupled to vibration table 202, wherein vibration table 202 is controlled by vibration table controller 204 which is coupled to composite-vibration-profile-storage mechanism 206.

Computer system 200 is the computer system under test and can be any computer system, including but not limited to a server, a server blade, a datacenter server, an enterprise computer, or any other computation system.

Vibration table 202 generates vibrations in response to signals from vibration-table controller 204. Vibration table 202 can be implemented in any technology now known or later developed and can include mechanisms for producing vibrations that are well-known in the art.

Vibration table controller 204 can include any mechanism that can control vibration table 202 to vibrate based on signals received from composite-vibration-profile-storage mechanism 206. Vibration table controller 204 can be implemented in any technology now known or later developed and can include mechanisms for controlling vibration table 202 that are well-known in the art. In some embodiments, vibration table controller 204 and/or composite-vibration-profile-storage mechanism 206 are included in vibration table 202. In some embodiments vibration table controller 204 and/or composite-vibration-profile-storage mechanism 206 operate on one or more computer systems.

Composite-vibration-profile-storage mechanism 206 stores a composite vibration profile generated in accordance with embodiments of the present invention. In some embodiments, the composite vibration profile includes vibrations along up to three orthogonal linear vibration axes and up to three orthogonal rotational vibration axes. In general, composite-vibration-profile-storage mechanism 206 can be implemented in any combination of hardware and software. In some embodiments, composite-vibration-profile-storage mechanism 206 is implemented in hardware or a combination of hardware and software on a computer system. In some embodiments, composite-vibration-profile-storage mechanism 206 includes a memory. In some embodiments, composite-vibration-profile-storage mechanism 206 includes a wired or wireless communications mechanism, or a connection through the Internet, to transfer information including a composite vibration profile.

During operation, vibration table controller 204 controls vibration table 202 to vibrate computer system 200 according to the composite vibration profile stored in composite-vibration-profile-storage mechanism 206. In some embodiments, vibration table controller controls vibration table 202 to vibrate at predetermined frequencies in a set of frequencies in a frequency range, and the amplitude of vibration at each frequency in the set of frequencies is determined based on the composite vibration profile from composite-vibration-profile-storage mechanism 206. In some embodiments, vibration table controller 204 controls vibration table 202 to vibrate at frequencies at least from 50 Hz to 2,500 Hz in 1 Hz increments, with the amplitude at each frequency determined by the composite vibration profile stored in composite-vibration-profile-storage mechanism 206. Note that other frequency ranges may be used without departing from the present invention.

During the above process, in one sweep of vibration frequencies over the frequency range, computer system 200 is vibrated at the maximum amplitude at each frequency measured by the test computer system in each configuration measured. In some embodiments, the vibration frequencies are swept through the frequency range one time for each vibration axis in the composite vibration profile, and computer system 200 is vibrated at the maximum amplitude for each frequency along each linear and/or rotational vibration axis measured by the test computer system in each configuration measured. In some embodiments, the throughput of a disk drive in computer system 200 is measured during the vibration of computer system 200.

In some embodiments, vibration table controller 204 controls vibration table 202 to simultaneously vibrate at set of frequencies with corresponding amplitudes determined by the composite vibration profile stored in composite-vibration-profile-storage mechanism 206. For example, in some embodiments, the composite vibration profile includes frequencies in the range from 50 Hz to 2,500 Hz along with their corresponding amplitudes and vibration table controller 204 controls vibration table 202 to simultaneously vibrate at a predetermined number of evenly space frequencies in the frequency range.

In some embodiments, vibration table controller 204 controls vibration table 202 to vibrate at frequencies and with relative amplitudes determined by the composite vibration profile stored in composite-vibration-profile-storage mechanism 206, while the absolute amplitudes of the vibrations are set to a predetermined value. The predetermined value for the amplitude of the vibrations can include but are not limited to a root mean square (rms) acceleration of: 0.2 g, 0.4 g, 0.6 g, 0.8 g, 1 g, or any other amplitude desired. For example, in some embodiments, vibration table controller 204 controls vibration table 202 to simultaneously vibrate at a predetermined number of evenly spaced frequencies in the frequency range based on the composite vibration profile stored in composite-vibration-profile-storage mechanism 206. The relative amplitudes of the frequencies are determined by the amplitudes stored for each frequency in the composite vibration profile, and the absolute amplitude determined by setting the rms acceleration of vibration table to a predetermined value as described above.

Figure 3:
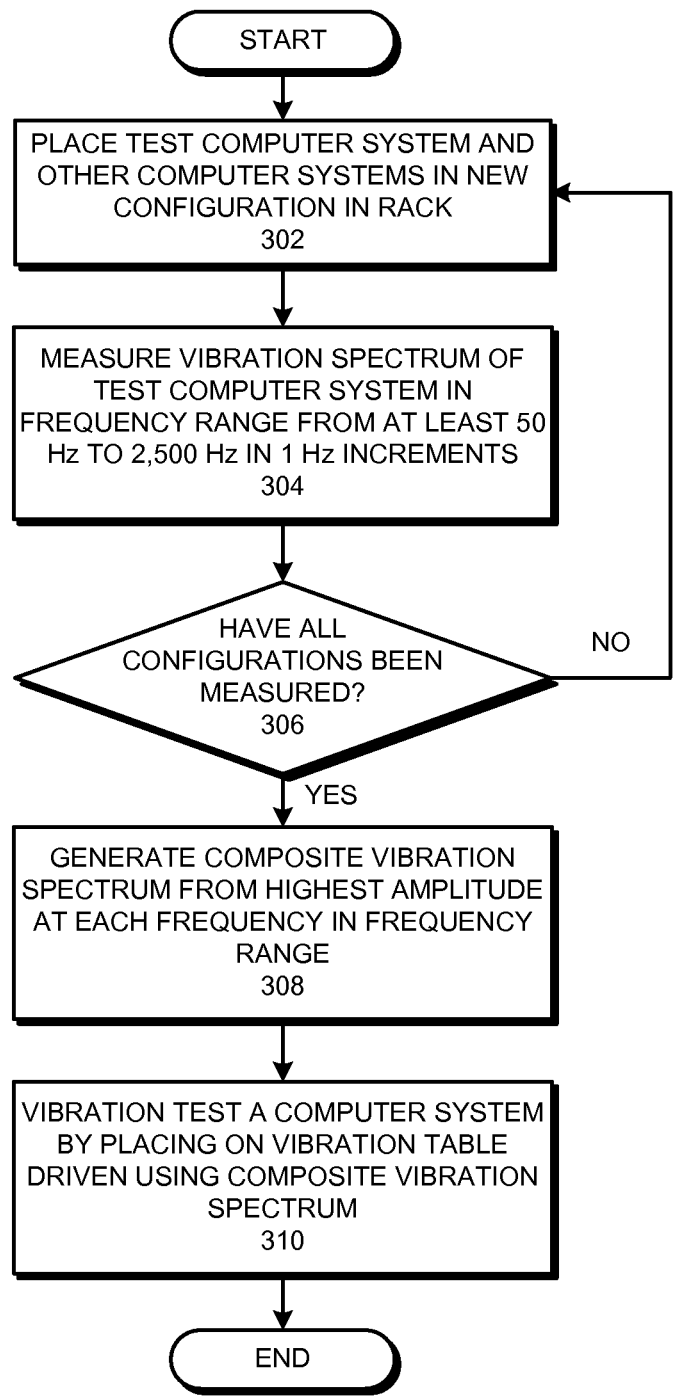
FIG. 3 presents a flowchart illustrating a process for generating a composite vibration profile in a frequency range for a computer system in accordance with some embodiments of the present invention.

FIG. 3 presents a flowchart illustrating a process for generating a composite vibration profile in a frequency range for a computer system in accordance with some embodiments of the present invention. The test computer system and other computer systems are placed in a new configuration in a computer system rack (step 302). The vibrations of the test computer system are then measured in the frequency range at least from 50 Hz to 2,500 Hz in 1 Hz increments (step 304). Note that other frequency ranges and/or frequency increments may be used without departing from the present invention. If the vibration spectra of all configurations of the test computer system and the other computer systems in the rack have not yet been measured (step 306), then the process returns to step 302. If the vibration spectra of all configurations of the test computer system and the other computer systems in the rack have been measured (step 306), then a composite vibration spectrum is generated from the highest amplitude measured at each vibration frequency in the frequency range (step 308). Then, a computer system is vibration tested by placing it on a vibration table driven using the composite vibration spectrum (step 310).

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for generating a composite vibration profile in a frequency range for a computer system, the method comprising:
 measuring a vibration spectrum in the frequency range for a test computer system in each configuration in a set of configurations, wherein each configuration in the set of configurations includes a permutation of a location of the test computer system in slots in a set of slots in a computer system rack and a location of at least one other computer system in the slots in the set of slots in the computer system rack, wherein measuring the vibration spectrum comprises measuring the vibration spectrum along each vibration axis in a set of vibration axes, wherein the set of vibration axes comprises one or more of up to three orthogonal linear vibration axes and up to three orthogonal rotational vibration axes;
 using a processor to generate the composite vibration profile for the computer system based on the measured vibration spectra; and
 vibrating the computer system rack at a set of frequencies in the frequency range by sweeping through the frequency range one time for each vibration axis in the set of vibration axes, wherein vibrating the rack comprises, for each frequency in the set of frequencies, determining an amplitude for a vibration for the rack at the frequency based on the composite vibration profile.

2. The method of claim 1, wherein the method further comprises varying an operational mode of the test computer system and the other computer systems.

3. The method of claim 1, wherein configurations in the set of configurations include permutations of a location of a user environment.

4. The method of claim 1, wherein frequencies in the set of frequencies are separated by 1 Hz or less, and the frequency range includes frequencies from 50 Hz to 2,500 Hz.

5. The method of claim 1, wherein measuring the vibration spectrum includes measuring the vibration spectrum using one or more accelerometers.

6. The method of claim 1, wherein measuring the vibration spectrum includes measuring a first acceleration of a first location, a second acceleration of a second location, a third acceleration of a third location and a fourth acceleration of a fourth location, wherein the first location, the second location, the third location, and the fourth location are situated at vertices of a known tetrahedron.

7. The method of claim 1, wherein the method further comprises:
 for each frequency in the set of frequencies:
  selecting a maximum amplitude vibration from the vibration spectra for each configuration in the set of configurations for the frequency; and
  when using the processor to generate the composite vibration profile for the computer system based on the measured vibration spectra, including the selected maximum amplitude for the frequency.

8. The method of claim 7, wherein the computer system is vibrated at the selected maximum amplitude for each frequency along each vibration axis in the set of vibration axes.

9. The method of claim 1, wherein the set of configurations comprises at least one of a distance to heating or cooling equipment, and a cycling of the heating or cooling equipment.

10. The method of claim 1, wherein the set of configurations comprises at least one of different temperature behaviors and different humidity behaviors.

11. The method of claim 1, wherein the composite vibration spectrum is generated from a highest amplitude measured at each vibration frequency in the frequency range, and
 wherein vibrating the rack by sweeping through the frequency range comprises vibrating the rack, at each frequency in the set of frequencies, for each vibration axis in the set of vibration axes, at a maximum amplitude for the frequency.

12. The method of claim 1, wherein the set of vibration axes comprises the three orthogonal linear vibration axes and the three orthogonal rotational vibration axes.

13. A non-transitory computer-readable storage medium storing instructions that when executed by a computer cause the computer to perform a method for generating a composite vibration profile in a frequency range for a computer system, the method comprising:
 measuring a vibration spectrum in the frequency range for a test computer system in each configuration in a set of configurations, wherein each configuration in the set of configurations includes a permutation of a location of the test computer system in slots in a set of slots in a computer system rack and a location of at least one other computer system in the slots in the set of slots in the computer system rack, wherein measuring the vibration spectrum comprises measuring the vibration spectrum along each vibration axis in a set of vibration axes, wherein the set of vibration axes comprises one or more of up to three orthogonal linear vibration axes and up to three orthogonal rotational vibration axes;

generating the composite vibration profile for the computer system based on the measured vibration spectra; and vibrating the computer system rack at a set of frequencies in the frequency range by sweeping through the frequency range one time for each vibration axis in the set of vibration axes, wherein vibrating the rack comprises, for each frequency in the set of frequencies, determining an amplitude for a vibration for the rack at the frequency based on the composite vibration profile.

14. The computer-readable storage medium of claim 13, wherein the method further comprises varying an operational mode of the test computer system and the other computer systems.

15. The computer-readable storage medium of claim 13, wherein configurations in the set of configurations include permutations of a location of a user environment.

16. The computer-readable storage medium of claim 13, wherein measuring the vibration spectrum includes measuring the vibration spectrum using one or more accelerometers.

17. The computer-readable storage medium of claim 13, wherein measuring the vibration spectrum includes measuring a first acceleration of a first location, a second acceleration of a second location, a third acceleration of a third location and a fourth acceleration of a fourth location, wherein the first location, the second location, the third location, and the fourth location are situated at vertices of a known tetrahedron.

18. An apparatus that generates a composite vibration profile in a frequency range for a computer system, the apparatus comprising:

a measuring mechanism configured to measure a vibration spectrum in the frequency range for a test computer system in each configuration in a set of configurations, wherein each configuration in the set of configurations includes permutations of a location of the test computer system and a location of at least one other computer system in the slots in the set of slots in the computer system rack, and wherein configurations in the set of configurations include a vibration table coupled to the computer system rack, wherein, while measuring the vibration spectrum, the measuring mechanism is configured to measure the vibration spectrum along each vibration axis in a set of vibration axes, wherein the set of vibration axes comprises one or more of up to three orthogonal linear vibration axes and up to three orthogonal rotational vibration axes;

a generating mechanism configured to generate the composite vibration profile for the computer system based on the measured vibration spectra, wherein the generating mechanism includes a mechanism configured to generate the composite vibration profile based on a highest amplitude vibration from the vibration spectra at each frequency in a set of frequencies in the frequency range; and a vibration mechanism configured to vibrate the computer system rack at a set of frequencies in the frequency range by sweeping through the frequency range one time for each vibration axis in the set of vibration axes, wherein, while vibrating the rack, the vibration mechanism is configured to, for each frequency in the set of frequencies, determine an amplitude for a vibration for the rack at the frequency based on the composite vibration profile.

* * * * *